US006349166B1

(12) United States Patent
Kaliszek et al.

(10) Patent No.: US 6,349,166 B1
(45) Date of Patent: Feb. 19, 2002

(54) ADHESIVE SYSTEM FOR A FIBER OPTIC GYROSCOPE SENSING COIL

(75) Inventors: Andrew Kaliszek, Phoenix; Matthew Olson, Glendale, both of AZ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/222,260

(22) Filed: Dec. 28, 1998

(51) Int. Cl.$^7$ ................................................. G02B 6/16
(52) U.S. Cl. ........................................ 385/137; 385/134
(58) Field of Search ................................. 385/134, 136, 385/137; 356/350

(56) References Cited

U.S. PATENT DOCUMENTS

| | | | |
|---|---|---|---|
| 4,197,654 A | 4/1980 | Van Steenwyk et al. | 33/304 |
| 4,559,713 A | 12/1985 | Otto et al. | 33/302 |
| 4,594,790 A | 6/1986 | Engebretson | 33/304 |
| 4,712,306 A | 12/1987 | Cahill et al. | 33/304 |
| 5,181,270 A | 1/1993 | Hsu et al. | 385/134 |
| 5,444,534 A | 8/1995 | Dyott et al. | 356/350 |
| 5,545,892 A | 8/1996 | Bilinski et al. | 250/231.12 |
| 5,546,482 A | 8/1996 | Cordova et al. | 385/12 |
| 5,742,390 A | 4/1998 | Cordova et al. | 356/350 |
| 5,822,065 A | 10/1998 | Mark et al. | 356/350 |

FOREIGN PATENT DOCUMENTS

| | | |
|---|---|---|
| EP | 0 660 082 A | 6/1995 |
| JP | 05215559 | 8/1993 |
| JP | 07280574 | 10/1995 |
| JP | 08136732 | 5/1996 |
| WO | WO 98/05935 | 2/1998 |

*Primary Examiner*—Frank G. Font
*Assistant Examiner*—Andrew H. Lee
(74) *Attorney, Agent, or Firm*—Christene M. Szwere

(57) ABSTRACT

An adhesive system for use in minimizing the negative environmental influences on a fiber optic gyroscope comprises a free-standing substantially cylindrical sensing coil 12 having an inner coil surface, a rigid substantially cylindrical coil-supporting structure or hub 10 having a cylindrical wall and an outer surface, a plurality of grooves 16 formed into the hub's outer surface, a plurality of slots 24 formed into the outer surface of hub 10 and an adhesive 14 affixing hub 10 to coil 12. Adhesive 14 may be injected into manifolds 18 located in the cylindrical wall of hub 10, travel through the slots 24 into a gap existing between coil 12 and hub 10. Excess adhesive 14 may flow into grooves 16. Different orientations and sizes of grooves 16 and slots 24, different types and amounts of adhesive 14, and different thicknesses of adhesive between the coil 12 and hub 10 may be used to achieve suitable adhesion. The adhesive system may further include a stress buffer 22 and an additional adhesive 20 to further minimize environmental influences on coil 12. Specifically, a first adhesive 14 affixes the inner surface of buffer 22 to the outer surface of hub 10. A second adhesive 20 affixes the outer surface of buffer 22 to the inner surface of coil 12.

36 Claims, 4 Drawing Sheets

ADHESIVE SYSTEM FOR A FIBER OPTIC GYROSCOPE SENSING COIL

TECHNICAL FIELD OF THE INVENTION

The present invention generally relates to fiber optic gyroscopes. More particularly, the present invention relates to a sensing coil and hub assembly of a fiber optic gyroscope.

BACKGROUND OF THE INVENTION

Fiber optic gyroscopes use optical fibers for transmitting light waves in order to determine rotational movement. Optical fibers are strands of glass fiber which are used to transmit optical signals over long distances with low loss and distortion. Optical fibers are typically comprised of an inner glass core, an outer glass cladding, where the inner glass and the outer glass have different optical indices of refraction, and a plastic coating, or jacket, placed over the glass. Optical fibers may be tightly and specifically wound into a cylindrical structure known as a sensing coil.

In a fiber optic gyroscope, light traveling through these fibers is divided by a beam splitter into two counterpropagating waves, propagating in phase with respect to each other, which enter different ends of a sensing coil. When the fiber optic gyroscope is not rotating, the two waves return exactly in phase after having traveled the same path in opposite directions. When the fiber optic gyroscope is rotating, or more specifically, when the coil is rotating, one wave travels a longer path in the coil than the other wave to get from one end of the coil to the other, thus offsetting the phases of the two waves with respect to each other. The speed of the rotation of the coil does not affect the time the light takes to travel between any two points along the coil because the speed of light is independent of the velocity of the medium through which the light travels. Hence, the difference between the phases of the two counterpropagating waves indicates the rotation of the coil and is measured via electrical circuitry.

Environmental factors may adversely affect the phase difference between the counterpropagating waves. That is, environmental factors such as temperature and mechanical strain, may create a bias between the phases of the counterpropagating waves such that the output of the sensing coil may yield a phase difference between the two waves which is indistinguishable from a rotation-induced phase difference. Another environmental factor, vibration, may induce motion of the sensing coil with respect to the hub, resulting in spurious output. Environmental factors that are constant can be compensated for in determining the actual rotation of the sensing coil. In other words, at zero input, the output of the sensing coil may yield a non-zero output as a result of environmental factors which appears as a phase difference between the two counterpropagating waves. If the non-zero output is constant, it may be adjusted for such that an accurate phase difference indicating only coil rotation may be determined. However, a non-constant non-zero output may not be adequately adjusted for and may cause the sensing coil to produce a result yielding a phase difference based both on rotation and on environmental influences.

As stated above, one such environmental factor is temperature. A fiber optic gyroscope is exposed to various temperatures during its operation. Temperature variations affect the sensing coil in two ways: first, the sensing coil undergoes mechanical strain as a result of differential thermal expansion; second, the optical transmission properties of the optical fiber change with temperature.

A sensing coil of a fiber optic gyroscope is incorporated into the structure of the gyroscope via a coil-supporting structure known as a hub. The hub and coil are both substantially cylindrical structures oriented about a center axis where the hub has a smaller radius relative to the radius of the coil. Typically, hub material and sensing coil material exhibit different coefficients of thermal expansion. For example, the thermal expansion of a hub made from an isotropic material may occur relatively uniformly in both the axial direction with respect to the center axis and in the radial direction. However, the thermal expansion of a coil may occur non-uniformly in the axial direction and in the radial direction. More specifically, a coil may exhibit a relatively large thermal expansion in the axial direction in a manner similar to that of the isotropic hub; however, the coil may exhibit a relatively small or negative thermal expansion with respect to the isotropic hub in the radial direction. As a result, in this example, when a fiber optic gyroscope is exposed to a temperature change such that expansion of its coil and hub occur, because the hub is radially expanding faster than the coil, strain is imparted to the sensing coil, and in the extreme, may create folds, cracks or other mechanical instabilities in the coil.

Thus, in selecting a hub for attachment to a coil it is advantageous if the thermal expansion coefficient of the coil and the hub are approximately equal. It is relatively simple to closely match the thermal expansion coefficients in only the radial direction or only the axial direction, but it is difficult to find a suitable hub material which closely approximates the thermal expansion coefficient of the coil in both directions while also being suitable for connecting the coil to the structure of the gyroscope.

In addition to the selection of materials in a coil/hub adhesive system, the manner of adhesion is also problematic. Continuously bonding the hub to the coil may impose undesirable strains on the coil over temperature variations because the adhesive acts as a constrained fluid, applying hydrostatic pressure on the coil.

In addition to temperature, vibration is an environmental factor which also affects the output of the gyroscope. Vibration is induced into the coil from its attachment to the hub. This vibration contributes to bias between the phases of the counterpropagating waves which are output from the sensing coil. Thus, there is a need for reducing the vibration experienced by the coil in order to obtain more accurate coil rotation information.

Additionally, there is a need to develop a realistic, manageable adhesive system which will work within a range of tolerances for parts. More specifically, machined parts such as hubs and coils typically vary to some degree in size, shape or the like. Typically the parts are manufactured to have component tolerances which are within determined acceptable tolerance levels. It would be cost prohibitive to customize a part for its specific use, i.e., to custom-machine each hub based on the final size and shape of each coil. Therefore, there is a need to design an adhesive system which is self-adaptive to variations in part sizes which are within acceptable tolerance levels for affixing a coil to a hub.

In sum, several factors may be considered in optimizing a coil/hub adhesive system. Typically these factors are the environmental factors discussed above, namely thermal expansion and contraction, vibration and mechanical strain. However, many other factors also affect the specific selections in a particular coil/hub adhesive system. These include, among others, the particular application in which the fiber optic gyroscope will be operated, the tolerances associated with the various manufacturing processes and the costs incurred with the selection of materials and processes. Typically, the most efficient coil/hub adhesive system results from balancing these factors because not all factors may be optimized for a particular application. For example, hub materials may be selected which approximate the thermal expansion characteristics of the coil in an axial direction or a radial direction, but it is difficult to create a material that approximates the thermal expansion characteristics of the coil in both directions. Alternatively, composite materials may be designed to closely approximate the thermal expansion characteristics of the coil; however, such composite materials introduce complications in the manufacturing of finishing operations.

SUMMARY OF THE INVENTION

Accordingly, it is an advantage of the present invention to improve the performance of a fiber optic gyroscope by minimizing environmental influences, such as temperature, vibration and mechanical strain, on a sensing coil in order to obtain more accurate rotational information about the coil.

Another advantage of the present invention is to design an adhesive system for affixing a sensing coil to a hub which is less sensitive to variations in part sizes which are within acceptable tolerance levels.

Another advantage of the present system is to design an adhesive system which minimizes the build up of hydrostatic pressure on the coil by allowing the adhesive to expand into grooves located between the bonding areas between the coil and the hub.

The above and other advantages are carried out in one form by an adhesive system for use in a fiber optic gyroscope comprising a free-standing substantially cylindrical sensing coil having an inner coil surface, a rigid substantially cylindrical coil-supporting structure or hub having a cylindrical wall and an outer surface, a plurality of grooves formed into the hub's outer surface, a plurality of slots formed into the hub's outer surface and an adhesive affixing the hub to the coil. A plurality of manifolds may be included in the hub's cylindrical wall for introducing the adhesive into the slots of the coil/hub assembly. More specifically, the adhesive may be injected into the manifolds, travel through the slots into a gap existing between the coil and the hub. Excess adhesive may flow into the grooves to separate bonding areas between the coil and hub. Different orientations and sizes of the grooves and slots, different types and amounts of adhesive, and different thicknesses of adhesive between the coil and hub may be used to achieve suitable adhesion.

In an alternate exemplary embodiment, the adhesive system may further include a stress buffer and additional adhesives to further minimize environmental influences on the coil. More specifically, a first adhesive affixes the inner surface of the buffer to the outer surface of the hub. A second adhesive affixes the outer surface of the buffer to the inner surface of the coil. The first adhesive is preferably flexible or compliant and the second adhesive is preferably rigid to minimize coil vibration.

BRIEF DESCRIPTION OF THE DRAWING

A more complete understanding of the present invention may be derived by referring to the detailed description and claims when considered in connection with the Figures, wherein like reference numbers refer to like items throughout the Figures, and:

DETAILED DESCRIPTION

Figure 1:
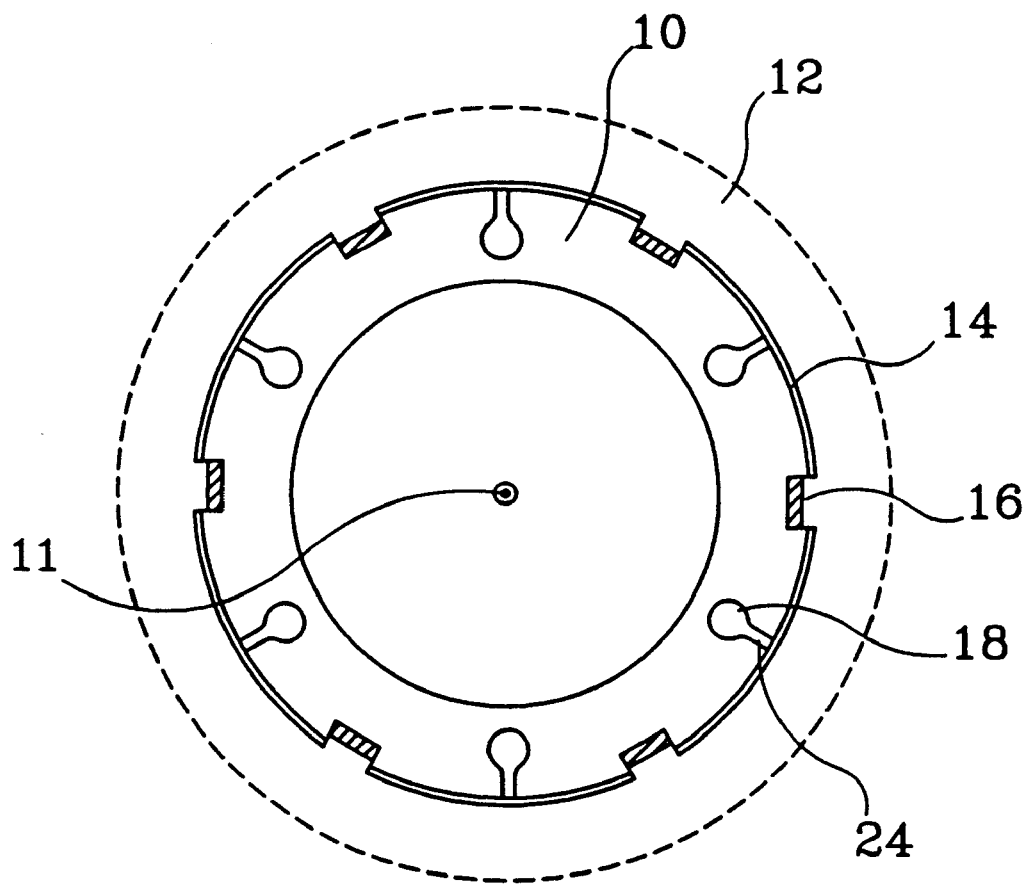
FIG. 1 shows a cross-sectional view of an exemplary sensing coil adhered to a hub.

The present invention employs an adhesive system for attaching a sensing coil to a support structure in a fiber optic gyroscope such that negative effects of environmental influences on the fiber optic gyroscope may be minimized. FIG. 1 depicts a coil/hub adhesive system in which a substantially cylindrical fiber optic sensing coil 12 circumscribes a substantially cylindrical support structure, e.g., a hub, 10. Both coil 12 and hub 10 are oriented about a center axis 11. A relatively small gap with respect to the radii of coil 12 and hub 10 exists between coil 12 and hub 10 into which an adhesive 14 is applied to affix coil 12 to hub 10.

Coil 12 is typically composed of optical fibers which are made from a glass medium. Each fiber has an inner glass core and an outer glass shell, where the inner glass and the outer glass have different optical indices of refraction. A plastic coating, or jacket, is placed over the glass to protect the surface of the glass from defects. The optical fibers are then specifically wound onto a bobbin, adhered and cured to make coil 12 self-supporting when separated from the bobbin. Self-supporting coil 12 is substantially cylindrical, having a relatively thick cylindrical wall of fiber. The bobbin nominally sets the dimensions of coil 12, such as the inside diameter, the height, and the outside diameter depending upon how many layers or turns of fiber are used. Typically, once coil 12, is removed from the bobbin it is temperature cycled for stability. Because of the temperature exposure and the relaxation of stresses that are introduced during the winding of the fibers, the dimensions of coil 12 slightly change from those initially established from the bobbin. For example, the diameter of coil 12 might change by 0.1 to 0.2 percent after coil 12 is removed from the bobbin.

Coil 12 is sensitive to temperature fluctuations and exhibits thermal expansion and contraction in response to such fluctuations. When exposed to temperature variations, coil 12 may expand non-uniformly in its axial direction with respect to center axis 11 and its radial direction. The rate at which coil 12 expands depends in part upon its material composition.

Hub 10 is a substantially cylindrical rigid structure oriented around center axis 11 to which coil 12 may be affixed. Typically, the radial length from the center axis to the inner surface of the cylindrical wall of hub 10 is greater than the radial length from the inner surface of the cylindrical wall to the outer surface of the cylindrical wall, although alternative thicknesses of the cylindrical wall may also be suitable. The outer surface of the cylindrical wall of hub 10 supports coil 12 so that it may be included in the optical/electrical circuit of a fiber optic gyroscope.

Hub 10 may be made from a variety of materials. Exemplary hub materials include metal alloys such as MONEL® or titanium; sintered metal composites made using powder metallurgy such as copper tungsten or copper molybdenum; composite materials, such as filament wound fiber glass/ epoxy, fiber glass/epoxy or aramid/epoxy; metal matrix composites such as metal reinformed with ceramics such as boron, silicon, carbide or graphite; ceramics; or a composite made from any of the above materials. Each of these materials exhibits different thermal expansion properties. Suitably, the materials exhibit a thermal expansion coefficient which is less than 8E-6 1/K. It is to be noted that the present invention is not limited by the selection of hub material. The selection of hub material is based in part on the particular application of the fiber optic gyroscope and may influence the choice of both adhesive and hub to optimize a particular application. In general, however, the environmental influences will be more effectively minimized in coil 12 if the thermal expansion properties of hub 10 closely approximate the thermal expansion properties of coil 12.

In an embodiment of the present invention, adhesive 14 is introduced into the coil/hub adhesive area through a plurality of manifolds 18 included in hub 10. Manifolds 18 extend axially, i.e., parallel to center axis 11, into the cylindrical wall of hub 10. Manifolds 18 facilitate the flow of adhesive 14 into a plurality of slots 24. Slots 24 extend radially outward from manifolds 18 with respect to center axis 11 through the cylindrical wall of hub 10. Adhesive 14 flows relatively evenly through manifolds 18, into slots 24, to the outer surface of hub 10 and into the gap between hub 10 and coil 12.

Manifolds 18 enable the relatively even distribution of adhesive 14 better than other methods. For example, adhesive 14 might be introduced into the coil/hub assembly at the gap between the edges of coil 12 and hub 10. This method of adhesive entry would not permit for equal distribution of adhesive 14 in the axial direction along coil 12. Most of adhesive 14 would gather at the edges of coil 12 and hub 10 with relatively little adhesive reaching the axial center line of coil 12 and hub 10.

A plurality of first grooves or notches 16 extend axially with respect to center axis 11 along the outer surface of hub 10. Grooves 16 have an inner bottom radial surface and an outer top radial opening. If the outer surface of hub 10 is relatively flat, excess adhesive 14 would flow through manifolds 18 into the bottom of slots 24, out through the top of slots 24, through the gap and would exit the coil/hub assembly though the edges of coil 12 and hub 10. Therefore, one exemplary embodiment of the present invention includes grooves 16. Grooves 16 limit the flow of adhesive 14 away from the coil/hub assembly by providing a place for excess adhesive 14 to accumulate. Additionally, grooves 16 may provide for additional affixation of coil 12 to hub 10 if excess adhesive 14 collects in grooves 16 such that adhesive 14 fills the entire area of grooves 16. More specifically, because grooves 16 may be larger or deeper than slots 24, grooves 16 enable a larger accumulation of adhesive 14 to bond coil 12 to hub 10. Such a larger accumulation of adhesive 14 makes adhesive 14 more compliant. Additionally, grooves 16 enable the arrangement of discrete bonding areas between hub 10 and coil 12. Bonding hub 10 to coil 12 in discrete areas prevents the development of hydrostatic pressure on coil 12 by allowing the adhesive to expand into grooves 16 located between the bonding areas.

Adhesive 14 is selected to minimize the difference between the thermal expansion coefficients of hub 10 and coil 12, i.e., to provide a uniform temperature environment for coil 12, and to minimize the vibration induced to coil 12. In addition, adhesive 14 is selected to such that it cures relatively uniformly. Adhesive 14 is suitably made from silicone rubber or room temperature vulcanizing rubber (RTV rubber) and exhibits stable properties, such as stiffness and thermal conductivity ver the environmental temperatures to which the gyroscope is exposed.

An adhesive may be filled with one or more additional materials to enhance the fiber optic gyroscope performance by minimizing vibration-induced effects. Exemplary filler materials include glass particles, quartz, graphite powder, carbon black or aluminum oxide powder. It may be advantageous to use. modified adhesives, i.e., a combination of adhesive and filler material, e.g., RTV rubber with carbon black filler. Filled adhesives maintain flexibility during thermal loading and exhibit increased stiffness when dynamic loads or vibrations are applied. In other words, filled adhesives may increase the stiffness of the adhesion between a coil and a hub without compromising the thermal performance of the gyroscope.

A suitable soft adhesive may be RTV rubber or silicone rubber that has a Young modulus approximately equal to or less than 1000 psi. A suitable harder adhesive may incorporate filler material such that the resulting composition has a Young modulus approximately equal to or less than 2000 psi. The selection of adhesives properties, e.g., Young's modulus and adhesive thickness, depend on the particular application and environment in which the gyroscope will be used. In general, a typically adhesive layer may be 0.015 inches thick, but this value may vary depending upon the particular application. Compliant coil/hub bonds are suitably achieved via soft, thick adhesive layers and may be used in the case of high thermal loads, for example. Harder bonds are suitably achieved via thin, hard adhesive layers and may be used in the case of high vibration inputs, for example.

Several different embodiments of adhesive systems may be used to affix coil 12 to hub 10. Typically these systems have varying hub, groove, or slot arrangements. The selection of which embodiment is preferable depends upon the particular application, hub materials, and adhesive materials. In addition, the length, width and depths of slots 24 and grooves 16 may be modified in each of the alternative embodiments to achieve desirable adhesive properties.

For example, in one embodiment, the selection of adhesives and hub materials may mitigate variations in the output of a gyroscope resulting from changes in the optical transmission properties of the optical fiber with temperature by minimizing time-varying temperature gradients within the sensing coil. To accomplish this, the sensing coil is first contained within an isothermal enclosure, part of which is formed by the hub. Hub materials with high thermal conductivity are beneficial to minimize temperature gradients; the thermal mass (mass times specific heat of the material) of the hub minimizes rate of change of temperatures. Hub-to-coil adhesives with low thermal conductivity are preferred to minimize heat transfer rates to the sensing coil and to maintain thermal symmetry around the sensing coil.

Figure 2:
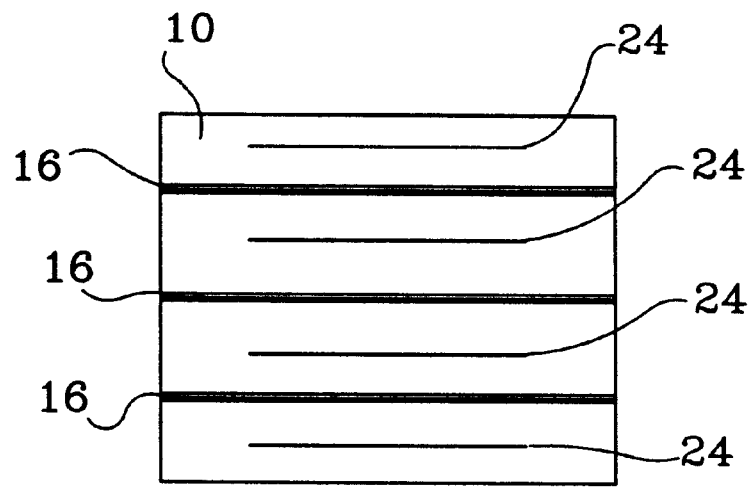
FIG. 2 shows a side view of an exemplary hub with the adhesive and the coil removed.

FIG. 2 depicts a side view of an embodiment of the present invention in which hub 10 includes grooves 16 which extend axially along the outer surface of hub 10 with respect to center axis (not shown in FIG. 2). Grooves 16 may extend the entire axial length of hub 10 or some lesser length. Additionally, the width of grooves 16 may vary depending upon the particular application, but suitably are wider than the width of slots 24. Slots 24 are located alternatively with grooves 16 along the outer surface of hub 10. Slots 24 also extend axially along hub 10 to a distance short of the edges of hub 10. While the length of slots 24 may vary, the length is suitably less than the axial length of coil 12 and less than the axial length of grooves 16. In this embodiment typically only one adhesive is used to bond coil 12 to hub 10.

Figure 3:
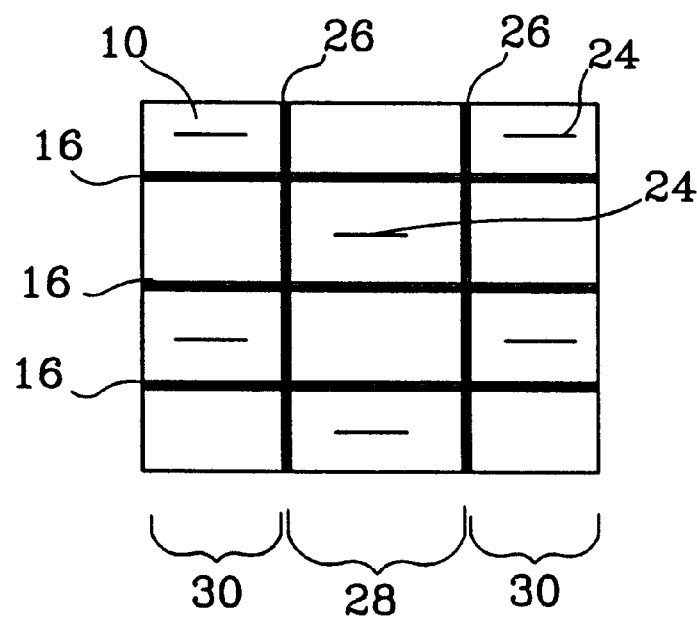
FIG. 3 shows a side view of an exemplary hub having circumferentially-extending grooves and axial-extending grooves with the adhesive and the coil removed.

FIG. 3 depicts a side view of an alternate embodiment of the present invention in which the outer surface of hub 10 is divided into a plurality of annular sections 28 and 30 by a plurality of second grooves 26 which are oriented circumferentially around the outer surface of hub 10. This "division" enables the tailoring of adhesive properties between coil 12 and hub 10 at various points. More particularly, this "division" enables the application of a first adhesive near the axial center line of coil 12 and a second adhesive near the axial ends of coil 12. The first adhesive may be stiffer or harder than the second adhesive to provide increased axial and rotational stiffness between coil 12 and hub 10. The second adhesive may be softer than the first adhesive to create compliant connections between coil 12 and hub 10 which provide angular stiffness between coil 12 and hub 10 without constraining the thermal expansion of coil 12. This multi-adhesive arrangement provides for good gyroscopic performance when exposed to temperature changes and vibration. A reverse adhesive combination, i.e., a soft first adhesive and a stiff second adhesive, provides for good gyroscopic performance in the presence of vibration, but compromises the coil's thermal sensitivity. While this embodiment depicts three annular sections, more or less sections may be used.

FIG. 3 depicts a groove "grid" created by first grooves 16 and second grooves 26. Slots 24 may then be placed in any number of orientations within this grid. For example, FIG. 3 shows slots 24 being placed alternately between center section 28 and end sections 30 along the outer surface of hub 10. Manifolds 18 (not shown in FIG. 3) may then be included to facilitate the transfer of adhesives from the outer edge of hub 10 to slots 24.

Figure 4:
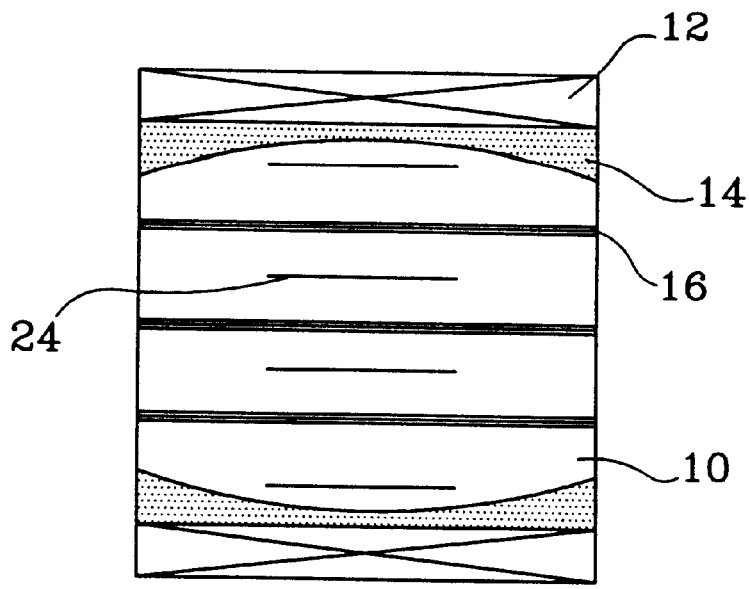
FIG. 4 shows a side view of an exemplary hub of varying adhesive thickness in the radial direction with the adhesive and the coil removed from the side of the hub.

FIG. 4 depicts a side view of an alternate embodiment of the present invention in which the radius of hub 10 varies axially with respect to center axis 11 (not shown in FIG. 4). More specifically, the radius of hub 10 tapers, being greatest at its axial center line and being smallest at its edges. This embodiment enables non-uniform thicknesses of adhesive 14 along the axial length of hub 10 to bond coil 12 to hub 10. Adhesive 14 may be thinner at the axial center of hub 10 and thicker at the ends of hub 10. Depending upon the selection of adhesive 14, a thin layer of adhesive 14 at the axial center line provides increased axial and rotational stiffness while a thicker layer of adhesive 14 at the end points provides angular stiffness between coil 12 and hub 10 without constraining the thermal expansion of coil 12.

Figure 5:
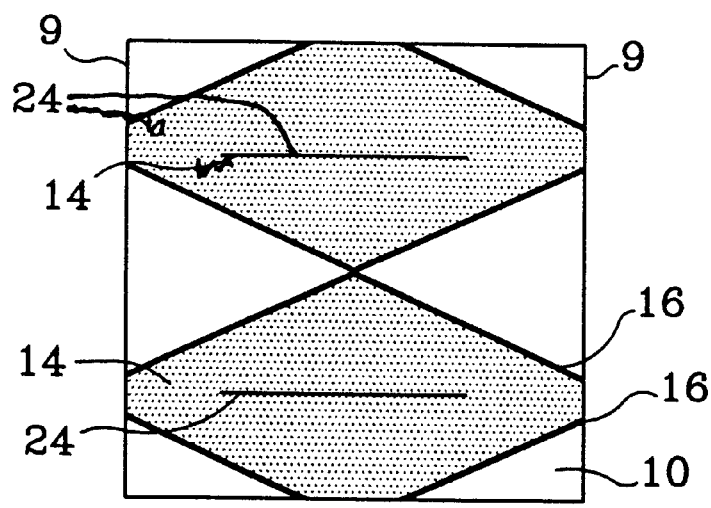
FIG. 5 shows a side view of an exemplary hub having diagonally-extending grooves, axially-varying adhesive distribution and the coil removed.

FIG. 5 depicts a side view of an alternate embodiment of the present invention in which the adhesive distribution between coil 12 and hub 10 may be varied. In this embodiment, the circumferential length of adhesive 14 varies axially along the outer surface of hub 10 while the radial thickness of adhesive 14 remains relatively constant. More specifically, grooves 16 are located on the outer surface of hub 10 in a diagonal orientation with respect to edges 9 of hub 10 forming substantially diamond-shaped sections. At the approximate center of these diamond-shaped sections are slots 24 through which adhesive 14 passes to bond coil 12 (not shown in FIG. 5) to hub 10. The orientation of grooves 16 permit adhesive 14 to adhere to a larger surface area of the outer surface of hub 10 at its axial center line and a smaller surface area at its edges 9. The large surface area of adhesive 14 at the axial center line provides increased axial and rotational stiffness while the smaller surface area of adhesive 14 at edges 9 provides angular stiffness between coil 12 and hub 10 without constraining the thermal expansion of coil 12.

The adhesive system is suitably tailored to match the environment in which the fiber optic gyroscope operates. There are many factors which may be considered in selecting an appropriate adhesive for the adhesive system in accordance with the present invention. For example, in , high-volume production of fiber optic gyroscopes, it is important to be able to correctly size the hub to the corresponding final size of coil 12 after any expansion or contraction occur upon removal from the bobbin. It would be cost prohibitive to customize each hub 10 to the resulting shape of each coil 12. Suitably, each hub 10 is machined to fit within the inner diameter of every coil 12 allowing for the appropriate gap. However, there will typically be some variation the actual size of coil 12 and hub 10. Therefore, a goal of the design of the adhesive mounting is to be insensitive to any such variations. The adhesive that bonds hub 10 to coil 12 suitably works with any feasible combination of part sizes.

It is advantageous if adhesive 14 is selected such that it allows for fluctuations or errors in the final inner diameter of coil 12 or the outer diameter of hub 10. For example, assume that a preferable gap between coil 12 and hub 10 is determined to be five thousandths of an inch. A decrease of the inner diameter of coil 12 by one or two thousandths of an inch after removal from the bobbin on which it was formed would be a significant decrease. This decrease in the gap area corresponds to a decrease in the thickness of adhesive 14 which bonds coil 12 to hub 10. Thus, a suitable selection of adhesive 14 for a particular application permits for fluctuations in its thickness between coil 12 and hub 10 while still achieving acceptable adhesion between coil 12 and hub 10.

Additionally, a suitable adhesive 14 may be selected to minimize the thermal expansion differences between hub 10 and coil 12. Although a sufficiently compliant adhesive may minimize the thermal expansion difference, such a compliant adhesive may not be suitable for minimizing other environmental factors.

Adhesive 14 is also selected to minimize the vibration transferred from hub 10 to coil 12. The vibration at the mounting point of coil 12 may be determined from knowledge of the vibration characteristics of the finished product. To minimize the sensitivity of coil 12 from environmental vibration, it is preferable to create a stiff mounting between coil 12 and hub 10 in both the axial and radial directions. This will minimize bouncing and rocking motions experienced by coil 12. A stiffer mounting may be achieved by increasing the adhesive surface area or by applying a stiffer adhesive at the axial center of coil 12.

Figure 6:
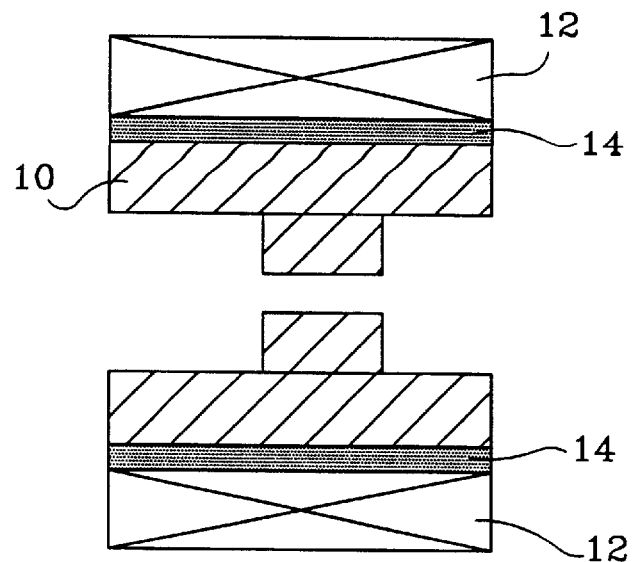
FIG. 6 shows a cross sectional view of an exemplary sensing coil adhered to a hub.
Figure 7:
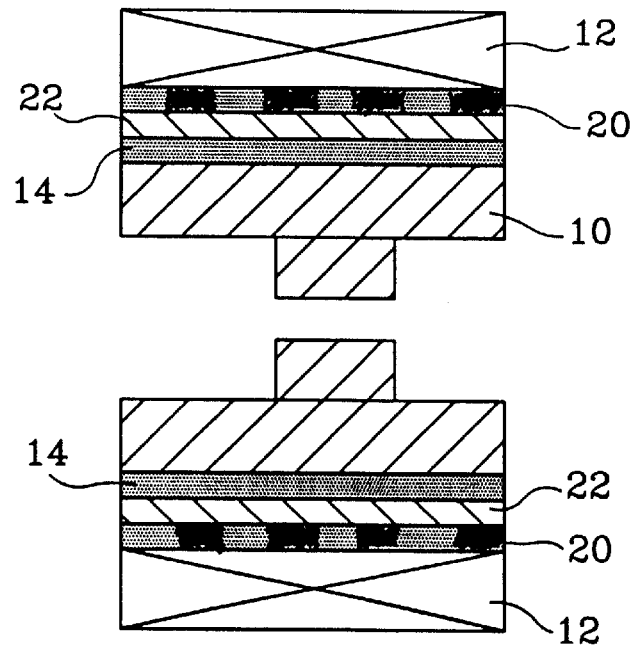
FIG. 7 shows a cross sectional view of an exemplary sensing coil adhered to a hub via a buffer.

The environmental influences on coil 12 may also be minimized by the inclusion of additional layers of material between coil 12 and hub 10. FIG. 6 shows a cross section of an embodiment of the present invention as discussed above. More specifically, FIG. 6 includes adhesive 14 placed between hub 10 and coil 12. An alternate embodiment of the present invention, as shown in FIG. 7, includes the addition of a stress buffer 22 and two layers of adhesive, namely adhesive 14 and adhesive 20. FIG. 7 shows the outer surface of hub 10 affixed to the inner surface of buffer 22 via adhesive 14 (instead of the inner surface of coil 12 as shown in FIG. 6). Adhesive 14 is introduced into the coil/hub assembly as described above using a plurality of manifolds, slots and grooves. Adhesive 20 affixes the outer surface of buffer 22 to the inner surface of coil 12.

Adhesive 20 may affix buffer 22 to coil 12 using any acceptable method now known or later discovered. For example, coil 12 may be wound on a bobbin as described above. Adhesive 20 may then be applied to the outer surface of coil 12 and stress buffer 22 may be wound on top of adhesive 20. In an alternate example, coil 12 and buffer 22 may be wound into two individual self-supporting non-rigid structures and arranged such that a gap exists between the outer cylindrical surface of buffer 22 and the inner cylindrical surface of coil 12. Adhesive 20 may be impregnated into this gap and substantially uniformly distributed with the assistance of a vacuum and/or pressure injection techniques. Suitable materials for adhesive 20 include the materials listed above for adhesive 14, which includes, e.g., a self-curing epoxy material.

Buffer 22 may be substantially cylindrical having a thin cylindrical wall in comparison to the cylindrical wall of hub 10. Buffer 22 may be a composite structure of non-optically functional fiber glass or graphite fiber or may be made from any of the materials listed above for hub 10. As discussed above, buffer 22 is suitably a wound non-rigid structure which is constructed on a bobbin in a manner similar to coil 12 or in some other manner now known or later discovered. An adhesive is used to bind the wound structure into buffer 22.

The adhesive properties that bond the fiber in wound buffer 22 may change with radial layer position. Relatively soft bonds may be used on the inner layers to provide compliance with hub 10. Relatively hard bonds may be used on the outer layers interfacing coil 12. The gradual increase of adhesive strength can be accomplished through varying the degree of ultraviolet energy to which the adhesive is exposed. The ultraviolet energy may be varied, for example, as a function of time, exposure, change of composition or the like.

Although adhesive 14 minimizes the thermal expansion mismatch and vibration-induce bias errors discussed above, the addition of buffer 22 and adhesive 20 minimize these negative environmental factors even further. Buffer 22 is effective at reducing stresses and strain that are directly induced into coil 12 by the mismatch in thermal expansion characteristics between coil 12 and hub 10. More specifically, buffer 22 partially absorbs strain which would otherwise be imparted to coil 12 as these negative environmental factors gradually diminish with the increase in layers of material between coil 12 and hub 10. Buffer 22 minimizes the thermal expansion mismatch between coil 12 and hub 10 in that the thermal expansion coefficient of buffer 22 is approximately the arithmetic average of the axial thermal expansion of hub 10 and coil 12.

In addition, buffer 22 provides stiff coupling between coil 12 and hub 10 to minimize vibration-induced bias errors in the output of coil 12. Buffer 22 lowers the sensitivity of coil 12 to vibration by increasing the resonance of coil 12 to a higher frequency range. In other words, in the absence of buffer 22, vibration resonance creates axial bouncing and rocking in coil 12. This resonance can be at least partly suppressed by the addition of a hard adhesive. Buffer 22, even when made with a soft adhesive binding the wound material, is still much stronger than just an adhesive and thus is better at reducing vibration-induced bias errors.

Adhesives 14 and 20 may be selected to optimize the adhesive system. More specifically, adhesives 14 and 20 can work in conjunction with one another to minimize the temperature variation and the vibration to which coil 12 is exposed. Suitably adhesive 14 is a flexible or softer adhesive which provides a compliant mounting between coil 12 and hub 10 and which aids in the matching of thermal expansion characteristics between coil 12 and hub 10. On the other hand, adhesive 20 is a harder, less compliant adhesive which aids in minimizing the vibration to which coil 12 is exposed.

It should be noted that any combination of the above embodiments may used to affix coil 12 to hub 10 in accordance with the present invention. This includes any suitable combination of groove orientations, slot orientations, annular ring divisions, hubs, adhesives and/or buffers.

It should be understood that the foregoing description is of exemplary embodiments of this invention and that this invention is not limited thereby. Various modifications may be made in the design, arrangement, and implementation of the present invention without departing from the spirit and scope of the present invention, as set forth in the claims below.

What is claimed is:

1. An adhesive system for use in a fiber optic gyroscope comprising:
    a free-standing substantially cylindrical sensing coil having an inner coil surface;
    a rigid substantially cylindrical coil-supporting structure having a cylindrical wall about a center axis, an outer structure surface and two edge surfaces, one at each end of said axis;
    a plurality of first grooves formed into said outer structure surface;
    a plurality of slots formed into said outer structure surface; and
    a first adhesive affixing said outer surface of said structure to said inner coil surface.

2. The adhesive system of claim 1, wherein said first grooves and said slots extend along said outer structure surface and parallel to said axis.

3. The adhesive system of claim 1, further comprising a plurality of manifolds formed into said cylindrical wall and parallel to said axis through which said adhesive is injected.

4. The adhesive system of claim 3, wherein one of said manifolds extends from one of said two edge surfaces to one of said slots.

5. The adhesive system of claim 1, wherein said first grooves alternate with said slots around said outer structure surface.

6. The adhesive system of claim 1, wherein said first adhesive has a Young modulus of approximately equal to or less than 1000 psi and is selected from the group consisting of RTV rubber and silicone rubber.

7. The adhesive system of claim 1, wherein said first adhesive includes a filler material to form a composition having a Young modulus of approximately equal to or less than 2000 psi.

8. The adhesive system of claim 1, wherein said first adhesive includes a filler material selected from the group consisting of glass particles, quartz, graphite powder, carbon black and aluminum oxide powder.

9. The adhesive system of claim 1, wherein said cylindrical wall tapers, being greatest at its center and smallest at its edges.

10. The adhesive system of claim 1, wherein said first adhesive has a thickness which varies along said outer structure surface, said thickness being greatest at said edge surfaces.

11. The adhesive system of claim 1, wherein said outer structure surface has a center, wherein said first grooves extend diagonally relative to said axis along said outer structure surface and said slots extend parallel to said axis along said outer structure surface and wherein said first adhesive adheres to said outer structure surface over an adhesion surface area which tapers, being greatest at said center.

12. The adhesive system of claim 1, wherein said coil has a first coefficient thermal expansion and said structure has a second coefficient of thermal expansion, and wherein said first adhesive is selected to minimize a difference between said first coefficient of thermal expansion and said second coefficient of thermal expansion.

13. The adhesive system of claim 1, wherein said first adhesive comprises:
 a buffer, having an inner buffer surface and an outer buffer surface;
 an inner adhesive affixing said outer structure surface to said inner buffer surface; and
 an outer adhesive affixing said outer buffer surface to said inner coil surface.

14. The adhesive system of claim 13, wherein said inner adhesive is more compliant than said outer adhesive.

15. The adhesive system of claim 13, wherein said outer structure surface has a center, wherein said first grooves extend diagonally relative to said axis along said outer structure surface and said slots extend parallel to said axis along said outer structure surface and wherein said inner adhesive adheres to said outer structure surface over an adhesion surface area which tapers, being greatest at said center.

16. The adhesive system of claim 13, wherein said coil has a first coefficient of thermal expansion and said structure has a second coefficient of thermal expansion, and wherein said buffer is selected to minimize a difference between said first coefficient of thermal expansion and said second coefficient of thermal expansion.

17. The adhesive system of claim 1, further comprising:
 a plurality of annular sections partitioning said outer structure surface; and
 a plurality of second grooves extending circumferentially around said outer structure surface and bordering said annular sections;
 wherein said first grooves extend along said outer structure surface parallel to said axis,
 wherein said slots are contained within partitions formed by said first grooves and said second grooves.

18. The adhesive system of claim 17, wherein said slots are parallel to said axis.

19. The adhesive system of claim 17, further comprising a second adhesive,
 wherein said annular sections include an inner annular section and two outer annular sections,
 wherein said first adhesive is affixed to said inner annular section, and
 wherein said second adhesive is affixed to said outer annular sections.

20. The adhesive system of claim 19, wherein said cylindrical wall tapers, being greatest at its center and smallest at its edges.

21. The adhesive system of claim 19, wherein said second adhesive has a thickness which is greater than a thickness of said first adhesive.

22. The adhesive system of claim 19, wherein said second adhesive is relatively soft to provide compliant adhesion between said coil and said structure and said first adhesive is relatively stiff to provide more rigid adhesion between said coil and said structure.

23. An adhesive system for use in a fiber optic gyroscope comprising:
 a free-standing substantially cylindrical sensing coil having an inner coil surface;
 a rigid substantially cylindrical coil-supporting structure having a cylindrical wall about a center axis, an outer structure surface and two edge surfaces, one at each end of said axis;
 a plurality of first grooves formed into said outer structure surface;
 a plurality of slots formed into said outer structure surface;
 a buffer having an outer buffer surface and an inner buffer surface;
 a first adhesive affixing at least a part of said outer structure surface to at least a part of said inner buffer surface; and
 a second adhesive affixing said outer buffer surface to said inner coil surface.

24. The adhesive system of claim 23, wherein said first grooves and said slots extend along said outer structure surface and parallel to said axis.

25. The adhesive system of claim 23, further comprising a plurality of manifolds formed into said cylindrical wall and parallel to said axis through which said first adhesive is injected.

26. The adhesive system of claim 25, wherein one of said manifolds extends from one of said two edge surfaces to one of said slots.

27. The adhesive system of claim 23, wherein said first grooves and said slots are alternately interspersed along said outer structure surface.

28. The adhesive system of claim 23, wherein said first adhesive has a Young modulus approximately equal to or less than 1000 psi and is selected from the group consisting of RTV rubber and silicone rubber and said second adhesive has a Young modulus approximately equal to or less than 2000 psi.

29. The adhesive system of claim 23, wherein said first adhesive includes a filler material selected from the group consisting of glass particles, quartz, graphite powder, carbon black and aluminum oxide powder.

30. The adhesive system of claim 23, wherein said second adhesive includes a filler material selected from the group consisting of glass particles, quartz, graphite powder, carbon black and aluminum oxide powder.

31. The adhesive system of claim 23, wherein said cylindrical wall tapers, being greatest at its center and smallest at its edges.

32. The adhesive system of claim 23, wherein said first adhesive has a thickness which varies along said outer structure surface, said thickness being greatest at said edge surfaces.

33. The adhesive system of claim 23, further comprising:
 a plurality of annular sections partitioning said outer structure surface; and
 a plurality of second grooves extending circumferentially around said outer structure surface and bordering said annular sections;
 wherein said first grooves extend along said outer structure surface parallel to said axis,
 wherein said slots are contained within partitions formed by said first grooves and said second grooves.

34. The adhesive system of claim 33, further comprising:
a third adhesive;
wherein said annular sections include an inner annular section and two outer annular sections,
wherein said first adhesive is affixed to said inner annular section and to said inner buffer surface,
wherein said second adhesive is affixed to said outer buffer surface and to said inner coil surface, and
wherein said third adhesive is affixed to said outer annular sections and to said inner buffer surface.

35. The adhesive system of claim 33, wherein said slots are parallel to said axis.

36. An adhesive system for use in a fiber optic gyroscope comprising:
a sensing coil;
a rigid structure for supporting said sensing coil; and
a plurality of discrete bonding areas between said sensing coil and said structure.

* * * * *